United States Patent [19]

De Long

[11] 4,082,884

[45] Apr. 4, 1978

[54] METHOD OF REDUCING FOULING OF MARINE STRUCTURES AND COATED STRUCTURE THEREOF

[75] Inventor: Charles F. De Long, Washington, D.C.

[73] Assignee: United States Trading International, Inc., Washington, D.C.

[21] Appl. No.: 614,927

[22] Filed: Sep. 19, 1975

[51] Int. Cl.² .................. B05D 3/02; B05D 3/04; B32B 7/00
[52] U.S. Cl. .................. 428/262; 428/264; 428/268; 428/416; 428/461; 428/463; 428/517–520; 428/533; 428/537; 428/538; 428/543; 427/340; 427/388 A; 427/407 R; 427/408; 427/409; 106/15 AR; 114/67 R; 260/29.6 NR; 260/29.6 RW; 9/6 R; 9/6 W
[58] Field of Search .................. 428/517–520, 428/533, 537, 538, 543, 463, 264, 268, 416, 262, 461; 427/407, 408, 409, 390, 340, 388; 260/29.6 NR, 29.6 RW; 106/15 AF; 9/6; 114/67

[56] References Cited

U.S. PATENT DOCUMENTS

| | | | |
|---|---|---|---|
| 2,489,228 | 11/1949 | Rudd | 117/161 |
| 3,471,359 | 10/1969 | Goldstein | 260/77.5 X |
| 3,697,312 | 10/1972 | Johnson et al. | 428/537 X |
| 3,702,778 | 11/1972 | Mueller et al. | 156/329 X |
| 3,786,113 | 1/1974 | Vassileff | 260/836 X |
| 3,821,145 | 6/1974 | Walus | 260/29.6 NR X |
| 3,990,381 | 11/1976 | Shepherd et al. | 114/67 R |

*Primary Examiner*—P. C. Ives
*Attorney, Agent, or Firm*—Strauch, Nolan, Neale, Nies & Kurz

[57] ABSTRACT

An anti-fouling overcoating composition for watercraft or stationary underwater structures precoated with hard-surface leaching-type anti-fouling paint consists essentially of an aqueous solution or dispersion of a carboxylated hydrophilic acrylic polymer, a cross-linking agent for the carboxylated hydrophilic polymer, polyethylenimine or a hydrophilic polyethylenimine derivative and an effective amount of an ultraviolet-absorbing agent.

15 Claims, No Drawings

METHOD OF REDUCING FOULING OF MARINE STRUCTURES AND COATED STRUCTURE THEREOF

BACKGROUND OF THE INVENTION

This invention relates to an anti-fouling overcoating composition for watercraft and underwater portions of marine structures precoated with a hard-surface leaching-type anti-fouling paint and to a method for reducing fouling and, secondarily, drag against flowing water of underwater structures, whether movable or stationary.

Marine fouling organisms, such as crustaceans (barnacles, Conchodermae), mollusks (boring worms and boring clams), annelids (tubeworms, Serpulidae), tunicates, algae, coelenterates, acorn shells (Balonidae), goose mussels (Lepodoids), and moss (Hydroidae) grow and accumulate on surfaces in an underwater environment. Wooden structures are particularly susceptible to attack by pileworms or shipworms (Teredinidae), limnoria, martesia, sphaeroma and the like. Metal water intake pipes for cooling towers in thermoelectric power stations, petrochemical factories or the like are commonly infested with and fouled by adherence of Blue mussel, sessile acorn barnacles (Balanus), oysters, moss (Bryozoa), Hydrozoa and the like.

"Fouling" can be defined as assemblages of marine animals and plants which grow on watercraft and underwater marine structures, as well as on rocks, stones and other natural objects. Marine fouling is a result of growth of marine animals and plants on the exposed surfaces of man-made marine structures, including bottoms and hulls of ships, pier supports, buoys, water-intake pipes, fishing nets, rowboats, water skis, ocean liners, tankers and other cargo ships, submarines, pilings, bridge substructures and the like. Marine fouling is an omnipresent problem, occurring whether the underwater surface is made from wood, metal, plastic, fiberglass, concrete or other structural material.

Fouling is economically harmful to the shipping industry because of the accompanying decrease in the speed of watercraft, resulting in higher power consumption and operating costs to maintain schedules, and because of the need to bring ships into drydock to remove the fouling and apply fresh paint. Furthermore, fouling can produce physical damage to watercraft or stationary underwater structures, resulting in shortened useful life and the need for frequent replacement. In the case of fishing nets, fouling causes an increase in the fluid resistance to water flowing therethrough, so that fish growing in a limited area, as is typical for areas of cultivation, are adversely affected by a poor supply of oxygen in the water.

Attempts to control fouling by marine organisms generally have been based on the use of chemicals which are toxic to a specific organism or group of organisms. Thus, creosote has been used for the impregnation of wooden surfaces. However, creosote is unsatisfactory for painted surfaces, for the reason that creosote bleeds through the paint.

A variety of anti-fouling agents have been developed which are toxic to deleterious marine organisms. Typical of these agents are cuprous oxide, mercury oxide or the like; organocopper salts, e.g., copper naphthenate, copper oleate, etc.; organotin compounds, e.g., bis-tributyl tin oxide, triphenyltin bromide, dibutyl ethyltin bromide; 1,2,3-trichloro-4,6-dinitrobenzene; dichlorodiphenyldichloroethane; nitrodiphenyl ether derivatives,; organolead compounds, e.g., triphenyl lead stearate, triphenyl lead chloride; 10,10'-oxybisphenoxazine (SA-6 546); hexachlorophene and tetrachloroisophthalonitrile, alone or in combination. However, most of these materials are highly toxic to other organisms and tend to leach out of the coating in which they are applied so that the coating composition becomes ineffective in preventing fouling after a period of time. Often, compositions containing these materials are difficult to apply to marine structures for lack of adequate adhesion or tend to peel from the structure after an unsatisfactorily short interval.

It is therefore apparent that there is a continuing need for anti-fouling systems which adhere tenaciously to the surface treated therewith, operate efficiently as antifoulants over a prolonged period of time and are not highly toxic to desirable forms of marine life.

SUMMARY OF THE INVENTION

It has been found, in accordance with this invention, that an anti-fouling overcoating composition for watercraft or stationary underwater structures precoated with hard-surface leaching-type anti-fouling paint consists essentially of an aqueous solution or dispersion of a carboxylated hydrophilic acrylic polymer, a cross-linking agent for the carboxylated hydrophilic polymer, polyethylenimine or a hydrophilic polyethylenimine derivative and an effective amount of an ultraviolet-absorbing agent.

In one embodiment of this invention, a method of reducing the fouling tendency of watercraft and stationary underwater structures consists of applying below the waterline of the pre-coated craft or structure the anti-fouling overcoating composition. In another embodiment, a marine structure protected against fouling by marine organisms consists of a watercraft or stationary marine structure precoated with hard-surface leaching-type anti-fouling paint and overcoated below the water line with the anti-fouling overcoating composition.

The coatings of this invention are protective glaze coatings for painted surfaces, especially on watercraft painted below the water line with hard-surfaced leaching-type anti-fouling paint and on other structures subjected to water exposure, such as underwater support structures for piers, docks, bridges and oil drilling rigs. The compositions of this invention are thought to function by providing protection against ultraviolet rays of the sun which break down the vehicle and pigments in conventional anti-fouling paint formulations. Such damage usually occurs down to about four feet below the water line.

It has been found that the compositions of this invention, when applied on the precoated underwater portion of a watercraft or stationary marine structure and permitted to dry provide a coating which provides prolonged anti-fouling activity and, secondarily, decreases the drag of water on the craft. The coating composition further increases the useful life of the undercoating on the watercraft.

As used in the specification and claims, "carboxylated hydrophilic acrylic polymer" means any copolymer which contains at least some carboxylic acid groups introduced by polymerization of an alpha,beta-unsaturated acid. Examples of alpha,beta-unsaturated acids for the purposes of this invention include acrylic acid, methacrylic acid, itaconic acid, crotonic acid, maleic acid, citraconic acid, ethacrylic acid and the like. Acrylic acid is preferred.

Monomers usable in the preparation of the carboxylated hydrophilic polymers of this invention include lower alkyl acrylate and methacrylate esters and monomers polymerizable therewith, including, but not limited to styrene, vinyl acetate, ethyl vinyl ether, substituted styrenes, and the like. However, the hydrophilic carboxylated polymers prepared from lower alkyl acrylate and methacrylate and carboxylic monomer exclusively are preferred. Typical of the esters preferred for making the carboxylated hydrophilic copolymers are the $C_1$-$C_4$ alkyl acrylates and methacrylates, such as methyl acrylate, ethyl acrylate, n-propyl acrylate, iso-propyl acrylate, the butyl acrylates and the corresponding methacrylates. Especially preferred monomers are methyl methacrylate, ethyl methacrylate, butyl acrylate, ethyl acrylate, methyl acrylate and mixtures thereof, particularly with from about 5 to about 20% by weight of acrylic acid monomer.

A composition particularly preferred for the purposes of this invention consists of a copolymer based on about 56% by weight of methyl methacrylate, about 30% by weight of ethyl methacrylate and about 14% by weight of acrylic acid. An equally preferred composition is based on about 44% by weight of butyl acrylate, 40% by weight of methyl acrylate and about 16% by weight of acrylic acid. Also preferred is a polymer containing about 90% by weight of ethyl acrylate and about 10% by weight of acrylic acid units.

Typical of commercially available hydrophilic polymers which can be used according to this invention is Carboset® 514, a disperson in ammonia water (30% solids) or Carboset® 514H, a dispersion in ammonia water (40% solids) or solution (514A) in isopropanol (70% solids) available from the B. F. Goodrich Chemical Co.

For ease of application, the copolymer or terpolymer is preferably solubilized in water by adjustment of the pH to 8 or higher. Suitable materials for adjustment of the pH include sodium hydroxide, ammonium hydroxide, potassium hydroxide or organic amines, including but not limited to dimethylamine, diisopropylamine, morpholine, triethylamine, ethylenediamine, 2-methylpiperazine, monoamylamine, dibutylamine, 2-amino-2-methyl-1,3-propanediol, and the like. Of the foregoing, ammonium hydroxide and diisopropylamine are preferred.

The molecular weight of the copolymer or terpolymer prior to cross-linking can vary between about 5000 and three million. Preferably, the molecular weight is between about 10,000 and 100,000. Although it is difficult to determine the molecular weight of the product after cross-linking, it is thought generally to be up to one million or higher.

Cross-linking agents suitable for the purposes of this invention include difunctional materials which react with the carboxyl groups of the hydrophilic acrylic polymers used herein. Exemplary of cross-linking agents which convert the hydrophilic polymers of this invention to essentially permanent overcoating compositions are formaldehyde condensation resins, epoxy compounds and multivalent metal ions. Formaldehyde resins include those based on melamine, such as the methylol melamines and the lower molecular weight melamine-formaldehyde resins as well as methylolated phenols and lower molecular weight phenol-formaldehyde resins. Epoxy compounds include diglycidyl and triglycidyl ethers and low molecular weight epoxy resins. Typical of multivalent metal ions which can be used are zinc, chromium, aluminum, iron, calcium, and titanium, in the form of salts, oxides or hydroxides.

Among commercially available formaldehyde resins which can be used as cross-linking agents are melamine-formaldehyde resins such as Resimene® RF 5306 (Monsanto Chemical Co.) and Cymel® 300 (American Cyanamid Co.). Melamine-formaldehyde resins and methylolated melamine derivatives are among the cross-linking agents preferred for the practice of this invention.

Commercially available epoxy compounds for the purposes of this invention include Epon® 828 (Shell Chemical Co.), the diglycidyl ether derived from epichlorohydrin and bisphenol A; Epon® 812 (Shell Chemical Co.), the triglycidyl ether of glycerol; Eponite® 100 (Shell Chemical Co.), a water-dispersible epoxy resin; and DER 332 (Dow Chemical Co.). Preferred epoxy compounds are the diglycidyl and triglycidyl ethers, especially bisphenol A diglycidyl ether and glycerine triglycidyl ether.

Although a variety of metallic ions can be used to provide cross-linking, the preferred system is one in which the cross-linking agent is zinc ions. A convenient way of preparing materials using zinc ions as cross-linking agent is to use a solution of zinc ammonium carbonate complex, which is added to the solution or dispersion of polymer.

The amount of cross-linking agent can be varied from about 1% to about 20% by weight (as solids) of hydrophilic acrylic polymer. Preferably the amount of cross-linking agent is from about 1% to about 5% by weight of the hydrophilic acrylic resin.

Although the compositions prepared according to this invention ultimately become cross-linked and adhere permanently to the watercraft or stationary marine structure being overcoated, it will be understood that the compositions used according to this invention have a reasonable life, provided that the hydrophilic acrylic resins and cross-linking agent are mixed at the site of application. Thus, a system consisting of a carboxylated acrylic terpolymer and a glycidyl ether has a life of about 6 days at room temperature, so that compositions for the practice of this invention can be prepared several days before use. Compositions using melamine-formaldehyde resins as the cross-linking agent have an apparently indefinite shelf life. Preferably, however, the hydrophilic acrylic resin and cross-linking agent are mixed just prior to use so that the products are of low viscosity for ease of application.

"Ultraviolet-absorbing agent," as used in the specification and claims, means a material which is compatible with the carboxylated hydrophilic acrylic polymer and cross-linking agent and which absorbs incident radiation in the range between about 2700 and about 4000 A. Among materials known to function as ultraviolet-absorbing agents are coumarin ethers; esters of para-aminobenzoic acid; such as the glyceryl ester; esters of substituted para-aminobenzoic acids and para-methoxycinnamic acid, e.g., the 2-ethoxyethyl ester; benzophenone derivatives, e.g., 2-hydroxy-4-methoxybenzophenone; triazolylketones, such as 2-phenyl-4-(2',4'-dihydroxybenzoyl)-v-triazoles and the corresponding ethers and esters; hydrazones derived from aromatic aldehydes; 2-phenylbenzoxazole derivatives; bisoxalic acid diamides; benzoylbenzofuran derivatives; formazan derivatives; and methal chelates of bicyclonoanedione esters; bis-alpha-cyano-beta,beta-diphenylacrylic acid derivatives; 2-aryl-4,5-arylo-1,2,3-triazoles; beta-benzoyloxy-2'-hydroxychalcones and the like.

The preferred ultraviolet-absorbing materials used in accordance with this invention are those which absorb from about 2700 to about 3300 A. Among compounds which absorb selectively in this more limited region are benzoylbenzofurans (Baron et al., U.S. Pat. No. 3,448,190), which absorb primarily from about 2900 to about 3200 A and various cinnamate esters, which absorb from about 2700 to about 3300 A. Particularly preferred as an ultraviolet-absorber is 2-ethoxyethyl p-methoxycinnamate, available under the trade name of Giv-Tan ® F from Sindar Division of Giuvadan Corp., Clifton, N.J.

The effective amount of ultraviolet-absorbing agent is from about 0.3 to about 7.5% by weight of the solution or dispersion. However, the preferred range is from about 0.5 to about 5.0% by weight of the solution or dispersion.

"Polyethylenimine or hydrophilic polyethylenimine derivative," as used in the specification and claims, includes derivatives of materials which can vary in molecular weight from about 1,000 to about 100,000. Hydrophilic polyethylenimine derivatives within the scope of this definition include hydroxyethylated polyethylenimine, which is the reaction product of polyethylenimine with ethylene oxide; propoxylated polyethylenimine, which is the reaction product of polyethylenimine with propylene oxide; epichlorohydrin modified polyethylene imine and urea-modified polyethylenimine. Generally, a weight ratio of 1:1 to 1:0.1 of polyethylenimine to ethylene oxide is preferred; for propylene oxide, 1:0.1 to 1:1.1; for epichlorohydrin about 1:1 and for urea about 1:1. Preferably, ethylenimine or hydrophilic ethylenimine derivatives used in the practice of this invention have a molecular weight from 1,000 to about 60,000, most preferably from about 40,000 to about 60,000.

Polyethylenimine can be purchased from the Dow Chemcial Co., Midland, Michigan. The product designated as PEI 600 has a molecular weight in the 40,000 to 60,000 range. PEI 600 and other commercially available polyethylenimines can be modified as set forth above to give hydrophilic derivatives.

The weight ratio of polyethylenimine or hydrophilic polyethylenimine derivative in the compositions of this invention to carboxylated hydrophilic acrylic polymers is preferably varied from about 10:1 to about 0.5:1.

The combination of carboxylated hydrophilic acrylic polymer and polyethylenimine or hydrophilic polyethylenimine derivative constitutes from about 5 to about 50% by weight of the solutions or dispersions of this invention, but preferably the combination is between about 5 and about 30% by weight.

The amount of cross-linking agent can be varied from about 0.1 to about 10% by weight of the aqueous solution or dispersion, but a level of from about 0.1 to about 2.5% by weight is preferred.

Optionally, the compositions of this invention can also contain one or more of the anti-fouling agents described above.

Coatings of the polymeric compositions of the invention may be applied by any conventional technique, including spraying, brushing, doctor blade application, and the like. Air drying is effective, although elevated temperatures which do not melt or burn the polymers may be used.

While water will generally be the preferred solvent, due to the economy, ease of handling and safety involved in using water, alternatively organic solvents may be employed. The aforementioned acrylic copolymers are soluble in, for example, t-butyl alcohol, diacetone 'alcohol, diethylene glycol, ethanol, isopropanol and methanol. Polyethylenimine and the aforementioned hydrophilic polyethylenimine derivatives, aside from being soluble in water, are soluble in the following organic solvents, for example: methanol, ethanol, propylene glycol, glycerine, ethylene glycol and triethylene glycol.

In this regard, the water-dispersible or soluble hydrophilic acrylic polymers used in accordance with this invention are easier and safer to apply than coatings known to the art, e.g., those based on hydroxyalkyl acrylates or methacrylates, which are applied from a non-aqueous solvent system. Specifically, ethanol is widely used as a solvent for these systems but the solvent is hazardous so that workers are forced to wear face masks and respirators, especially during warm weather.

"Hard-surface" anti-fouling paint, as used in the specification and claims, means any anti-fouling paint composition which dries to a hard, shiny surface, and which does not tend to chalk, rub off, or absorb water. That is, the precoating material used in conjunction with the overcoating compositions of this invention should not be hydrophilic or water-swellable. Marine paints which safisfy these criteria and are suitable as the precoating paint contain a film-forming base, typical examples of which include drying and semi-drying oils, e.g., linseed oil, soya bean oil, oitica oil, dehydrated castor oil and the like; pure and mixed esters of acids derived from dihydric and polyhydric alcohols and acids of drying or semi-drying oils, e.g., ethylene glycol, glycerol, pentaerythritol, mannitol, or propylene glycol esters of linoleic acid, oleic acid, ricinoleic acid, and the like; resins modified by drying or semi-drying oil, e.g. modified alkyd resins prepared by esterification of glycerol and phthalic anhydride and drying or semi-drying oil fatty acids; modified phenolic resins, such as those from reaction between the various cresols, formaldehyde and various drying or semi-drying oils; gum rosin and modified rosin-based resins, such as those obtained by esterifying rosin, glycerol or pentaerythritol and drying and/or semi-drying oil fatty acids; latex emulsions, e.g., butadiene-styrene copolymer emulsions, butadiene-acrylonitrile copolymer emulsions; vinyl polymers, e.g., vinyl chloride-vinyl acetate-vinyl alcohol copolymers and the like.

Typical of commercially available products which can be used as precoating materials are Interlux ®, a product of International Paint Co.; Vinylast, produced by Woolsey Paint Co.; and Vinyltex ®, obtainable from Baltimore Paint and Copper Co. "Leaching-type" anti-fouling agents, suitable for the precoating paint base, are of the types indicated above, that is mercuric oxide; organo copper, organolead and organotin compounds; chlorinated aromatic hydrocarbons; nitrated aromatic hydrocarbons; and the like. Materials which are not recommended for use in combination with the overcoating compositions of this invention include soft copper and bronze formulations, which tend to depend on scaling, erosion or sloughing off of the anti-foulant to release the active material; and tar-based combinations, such as typical creosote formulations, to which the compositions of this invention do not adhere.

It will be understood that the precoating materials used in the practice of this invention also generally contain pigments, e.g., titanium dioxide, clay, carbon black, calcium carbonate, diatomaceous earth, bentonite, etc., as well as volatile solvents commonly used in the art, e.g., turpentine, xylene, toluene, etc. Thinners, e.g., mineral spirits; plasticizers, e.g., tricresyl phosphate; metallic driers, e.g., manganese, lead, cobalt, calcium, and iron naphthenates, oleates, linoleates and octoates may also be present in these formulations.

The method of this invention consists of reducing the fouling tendency of watercraft and stationary underwater structures precoated with hard-surface leaching-type anti-fouling paint by applying below the waterline of the watercraft or underwater structure an anti-fouling overcoating composition consisting essentially of an aqueous solution or dispersion of a carboxylated hydrophilic acrylic polymer, a cross-linking agent for the carboxylated hydrophilic acrylic polymer, polyethylenimine or a hydrophilic polyethylenimine derivative and an effective amount of an ultraviolet-absorbing agent, as set forth above.

Preferably, the coating is applied to watercraft when new or when they are removed to a dry dock for renovation. In this case, the preferred method of this invention is to apply the coating to a surface which has been pre-wetted with water and permit the coating to dry in air.

In another embodiment, this invention consists of a watercraft or stationary marine structure overcoated with the composition of this invention, as set forth above.

The following examples depict in more detail the preparation of representative compositions and methods of their application in accord with the principles of the present invention.

EXAMPLE 1

An overcoating composition was prepared by mixing together 54.2 parts by weight of a terpolymer (56 parts by weight of methyl methacrylate, 30 parts of ethyl methacrylate and 14 parts of acrylic acid; molecular weight 30,000; 70% solution by weight in isopropanol); 3.4 parts by weight of aqueous ammonium hydroxide solution (28% by weight); 88.2 parts by weight of polyethylenimine (PEI 600, molecular weight 40,000–60,000; 40% by weight solution in water); 3.5% by weight of 2-ethoxyethyl p-methoxycinnamate (Givtan® F); and 254.2 parts by weight of deionized water. Just before use, glycerine triglycidyl ester (Epon® 812) was added at a rate of 1.25 ounce per gallon of solution.

The solution was brushed on a wood hull of an 85 foot boat in drydock, precoated with a vinyl type hard-surface paint containing a leaching-type anti-foulant (Woolsey Paint Co., Vinylast), from the waterline downward and permitted to dry in the air.

The craft, in subsequent operation, consumed less fuel than before the treatment and repelled all variety of underwater growth for more than 2 years according to tests.

EXAMPLE 2

An overcoating composition, made according to Example 1, except that bisphenol A diglycidyl ether (Epon® 828) was used, applied according to Example 1. The craft so treated exhibited the improvement in fuel consumption and repulsion of underwater growth noted in Example 1.

EXAMPLE 3

A dispersion was obtained from 40 parts by weight of a terpolymer (44 parts by weight of butyl acrylate, 40 parts of methyl acrylate and 14 parts of acrylic acid; molecular weight 16,000; 30% solution is ammonia water, pH 7.5; 2 parts of zinc ammonium carbonate complex (obtained by dissolving 7.2 parts by weight of ZnO and 12.7 parts by weight of ammonium carbonate in 71.4 parts by weight of water and then adding 8.7 parts by weight of concentrated ammonium hydroxide); 24 parts by weight of 2-ethoxyethyl p-methoxycinnamate; 90 parts by weight of aqueous ammonia solution (3% by weight of ammonia); 200 parts by weight of polyethylenimine (molecular weight 30,000–40,000; 40% solution by weight in water); and 300 parts by weight of deionized water.

Results obtained were similar to those of Examples 1 and 2.

EXAMPLE 4

A solution was prepared from 30 parts by weight of a copolymer obtained from 90 parts by weight of ethyl acrylate and 10 parts by weight of acrylic acid (30% by weight solution in aqueous ammonia; pH 7.5); 10 parts by weight of ammonium dichromate solution (30% by weight, 3% by weight of ammonia); 200 parts by weight of polyethylenimine (molecular weight 40,000–60,000; 40% solution by weight in water); 350 parts by weight of deionized water and 30 parts of 2-ethoxyethyl p-methoxycinnamate.

The solution was sprayed on a fiberglass hull of a drydocked pleasure craft precoated below the waterline with results similar to those obtained in Examples 1, 2 and 3.

It will be appreciated that the instant specification and foregoing examples are set forth by way of illustration and not limitation and that various modifications and changes may be made without departing from the spirit and scope of the present invention, which is intended to be limited only by the appended claims.

What is claimed is:

1. A marine structure protected against fouling by marine organisms consisting of a watercraft or stationary marine structure coated below the water line with a hard-surface leaching-type anti-fouling paint and overcoated with an anti-fouling composition consisting essentially of an aqueous solution or dispersion of a carboxylated hydrophilic acrylic polymer, a cross-linking agent for the carboxylated hydrophilic acrylic polymer, polyethylenimine or a hydrophilic polyethylenimine derivative and an effective amount of an ultraviolet-absorbing agent.

2. The structure of claim 1, wherein the effective amount of the ultraviolet-absorbing agent is from about 0.5 to about 5% by weight of the aqueous solution or dispersion.

3. The structure of claim 1, wherin the ultraviolet-absorbing agent absorbs from about 2700 to about 3300 A.

4. The structure of claim 1, wherein said carboxylated hydrophilic acrylic polymer and the polyethylenimine or hydrophilic polyethylenimine derivative constitute from about 5 to about 50% by weight of the solution or dispersion.

5. The structure of claim 1, wherein the cross-linking agent constitutes from about 0.1 to about 2.5% by weight of the aqueous solution of dispersion.

6. The structure of claim 1, wherein the ratio of polyethylenimine or hydrophilic polyethylenimine derivative to said carboxylated hydrophilic acrylic polymer is from about 10:1 to about 0.5:1.

7. The structure of claim 1, wherein the ultraviolet-absorbing agent is 2-ethoxyethyl p-methoxycinnamate.

8. A method of reducing the fouling tendency of watercraft and stationary underwater structures consisting of applying below the water line of the watercraft or underwater structure precoated with hard-surface leaching-type anti-fouling paint an anti-fouling composition consisting essentially of an aqueous solution or dispersion of a carboxylated hydrophilic acrylic polymer, a cross-linking agent for the carboxylated hydrophilic acrylic polymer, polyethylenimine or a hydrophilic polyethylenimine derivative and an effective amount of an ultraviolet-absorbing agent.

9. The method of claim 8, wherein said watercraft or underwater structure is pre-wetted with water prior to application of the anti-fouling composition.

10. The method of claim 8, wherein the effective amount of the ultraviolet-absorbing agent is from about 0.5 to about 5% by weight of the aqueous solution or dispersion.

11. The method of claim 8, wherein the ultraviolet-absorbing agent absorbs from about 2700 to about 3300 A.

12. The method of claim 8, wherein the carboxylated hydrophilic acrylic polymer and the polyethylenimine or hydrophilic polyethylenimine derivative constitute from about 5 to about 50% by weight of the solution or dispersion.

13. The method of claim 8, wherein the cross-linking agent constitutes from about 0.1 to about 2.5% by weight of the aqueous solution or dispersion.

14. The method of claim 8, wherein the ratio of polyethylenimine or hydrophilic polyethylenimine derivative to said carboxylated hydrophilic acrylic polymer is from about 10:1 to about 0.1:1.

15. The method of claim 8, wherein the ultraviolet-absorbing agent is 2-ethoxyethyl p-methoxycinnamate.

* * * * *

UNITED STATES PATENT AND TRADEMARK OFFICE
CERTIFICATE OF CORRECTION

PATENT NO. : 4,082,884
DATED : April 4, 1978
INVENTOR(S) : Charles F. De Long

It is certified that error appears in the above-identified patent and that said Letters Patent are hereby corrected as shown below:

Claim 14, line 4, change "0.1:1" to --0.5:1--.

Signed and Sealed this

Twenty-seventh Day of February 1979

[SEAL]

Attest:

RUTH C. MASON
Attesting Officer

DONALD W. BANNER
Commissioner of Patents and Trademarks